United States Patent [19]

Rosado et al.

[11] Patent Number: 5,752,773

[45] Date of Patent: May 19, 1998

[54] HIGH TEMPERATURE ROLLING ELEMENT BEARING

[75] Inventors: Lewis Rosado, Centerville; Nelson H. Forster, Bellbrook, both of Ohio; Wei T. Shih, Yorba Linda, Calif.

[73] Assignee: The United States of America as represented by the Secretary of the Air Force, Washington, D.C.

[21] Appl. No.: 828,725

[22] Filed: Mar. 14, 1997

[51] Int. Cl.$^6$ .................................................. F16C 33/44
[52] U.S. Cl. ........................ 384/527; 384/573; 384/907.1
[58] Field of Search ................................ 384/527, 523, 384/572, 573, 907.1, 911

[56] References Cited

U.S. PATENT DOCUMENTS

| | | | |
|---|---|---|---|
| 3,472,567 | 10/1969 | Johnson | 384/527 |
| 3,744,862 | 7/1973 | Schwartz | 384/527 |
| 4,522,883 | 6/1985 | Wallace et al. | 428/365 |
| 4,960,643 | 10/1990 | Lemelson | 384/907.1 X |
| 5,482,385 | 1/1996 | Yokota et al. | 384/527 X |
| 5,495,979 | 3/1996 | Sastri et al. | 228/124.1 |

FOREIGN PATENT DOCUMENTS

| | | | |
|---|---|---|---|
| 63-140118 | 6/1988 | Japan | 384/523 |
| 3272320 | 12/1991 | Japan | 384/527 |

*Primary Examiner*—Thomas R. Hannon
*Attorney, Agent, or Firm*—Charles E. Bricker; Thomas L. Kundert

[57] ABSTRACT

A novel rolling element bearing assembly comprises an inner race, an outer race, a plurality of rolling elements, and a carbon-carbon composite retainer. The carbon-carbon composite retainer is fabricated by providing a woven tube, cutting the woven tube into suitably sized rings, piercing the rings for rolling bearing elements, and densifying the resulting retainer. Alternatively, the tube can be densified, then cut into a plurality of retainer blanks which are then pierced. For use at operating temperatures above about 650° C., ceramic coatings, such as silicon carbide (SiC), silicon nitride ($Si_3N_4$) and boron nitride (BN) can be used to provide oxidation resistance for the carbon-carbon composite retainer at such elevated temperatures.

5 Claims, 2 Drawing Sheets

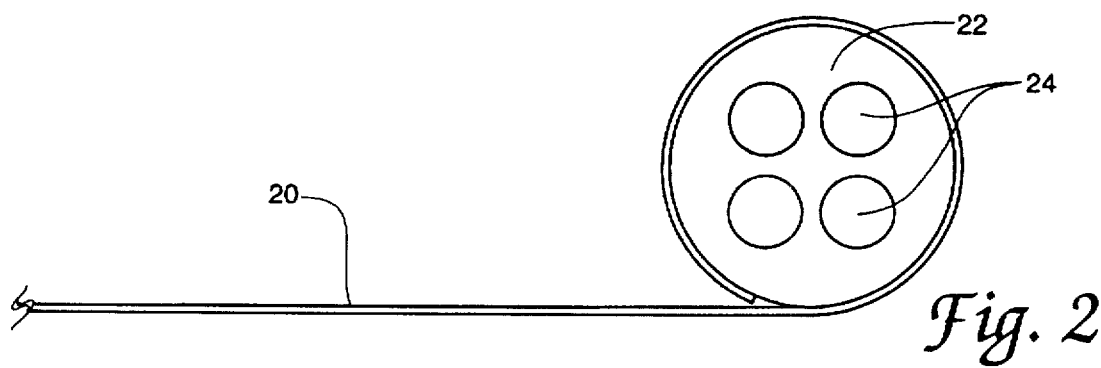
Fig. 2
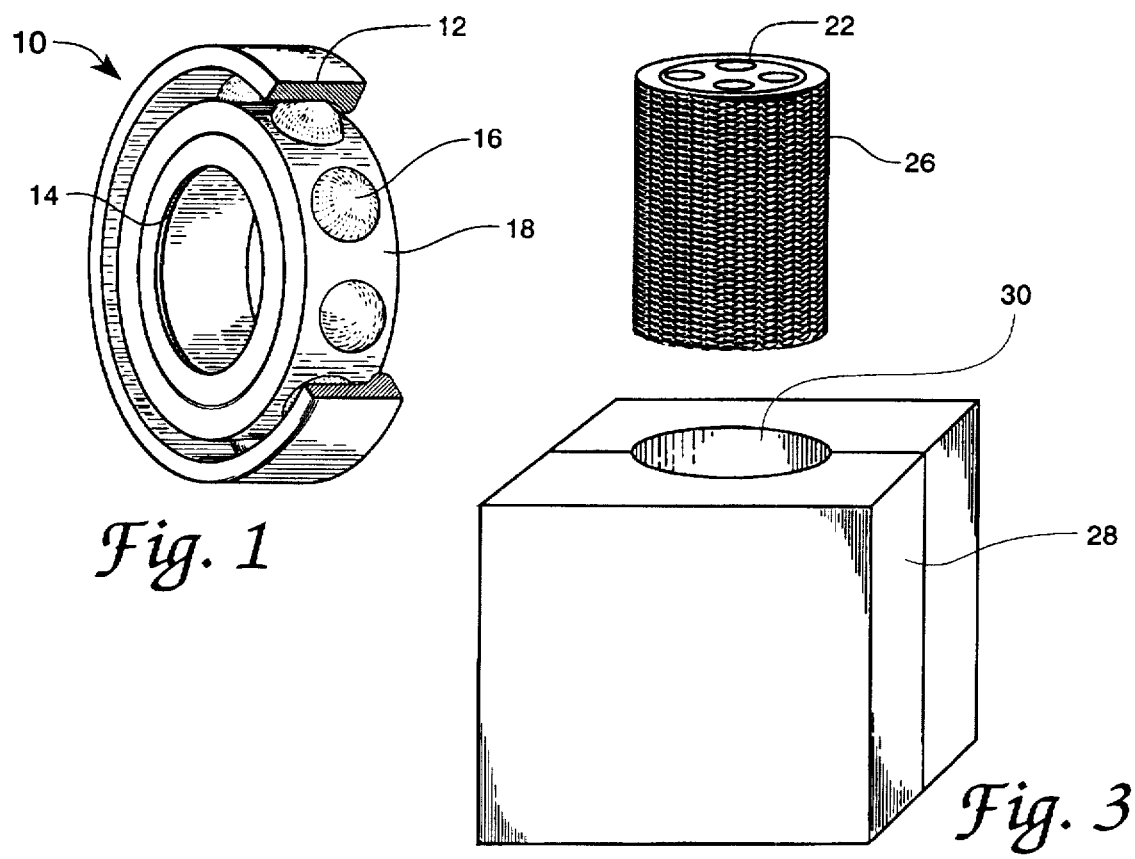
Fig. 1
Fig. 3

HIGH TEMPERATURE ROLLING ELEMENT BEARING

The invention described herein may be manufactured and used by or for the Government of the United States for all governmental purposes without the payment of any royalty.

BACKGROUND OF THE INVENTION

This invention relates to rolling element bearings, particularly to retainer components fabricated from carbon-carbon composites.

Liquid-lubricated rolling element bearings used in contemporary gas turbine engines and automotive engines are generally limited to operating temperatures of about 180° to 230° C. Advanced engines will require bearings capable of operating in the temperature range of 315° to 650° C. at speeds well above 3 million DN, where D is the bearing bore diameter in millimeters and N is the shaft RPM. Thus, new bearing materials and innovative lubrication schemes are required to meet these goals. Significant progress has been made in achieving high temperature lubrication through the use of novel techniques such as vapor phase and solid film lubrication; however, rolling element bearings operating under such harsh conditions generally exhibit inadequate life and performance. Consequently, bearing mechanical design and material selection become increasingly important.

Rolling element bearings generally consist of four components: the inner race, the outer race, the rolling elements (i.e., balls or rollers), and the retainer (also known as the cage or separator). The primary purpose of the retainer is to contain the rolling elements and prevent them from contacting one another during bearing operation. The retainer also ensures proper load distribution and balance within the bearing. Rolling element bearings for general use employ standard carbon steel, steel alloys or non-ferrous alloys as retainer materials. Some special use bearings use lightweight phenolic and graphite retainers. Engineering thermoplastics, such as polyetheretherketone (PEEK) have been considered as potential retainer materials. With the exception of graphite, these materials are limited to operating temperatures below about 430° C. Some of these materials lack the strength required for high speed operation.

In high speed bearings, centrifugal loads induced on the retainer can be significant. These loads are proportional to the mass of the retainer and the square of the retainer rotational speed. Additional loads are generated within the retainer as a result of complex rolling element-retainer collisions. Consequently, tensile stresses are developed within the retainer. Bearing retainers are also subjected to wear caused by pure sliding in the rolling element pocket area and retainer-land riding surface. The retainer becomes prone to unbalance if unevenly worn. Thus, a light-weight, high strength retainer material with good tribological characteristics and high temperature capability is desirable.

It is an object of the present invention to provide a novel rolling element bearing assembly.

It is another object of the present invention to provide a method for fabricating a rolling element bearing retainer.

Other objects and advantages of the present invention will be apparent to those skilled in the art.

SUMMARY OF THE INVENTION

In accordance with the present invention there is provided a novel rolling element bearing assembly comprising an inner race, an outer race, a plurality of rolling elements, and a carbon-carbon composite retainer.

In one aspect, there is provided a novel rolling element bearing assembly having a carbon-carbon composite retainer. In another aspect, there is provided a method for making a carbon-carbon composite retainer for a rolling element bearing assembly.

BRIEF DESCRIPTION OF THE DRAWINGS

In the drawings,

FIG. 1 illustrates a rolling element bearing, partly broken away;

FIG. 2 illustrates the winding of carbon fabric onto a cylindrical mandrel to provide a fabric tube preform;

FIG. 3 illustrates the rigidization of the fabric tube preform;

DETAILED DESCRIPTION OF THE INVENTION

Figure 4:
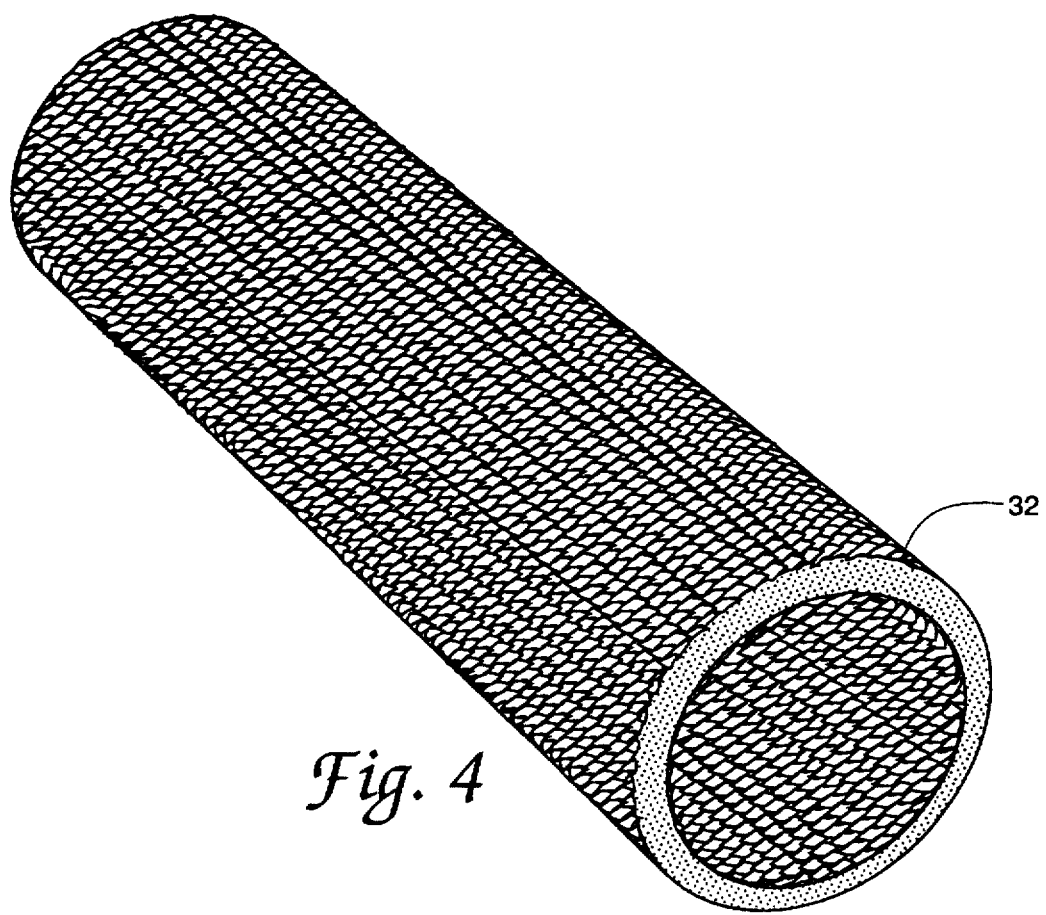
FIG. 4 illustrates a rigid fabric tube.

Referring to the drawings, FIG. 1 illustrates a rolling element bearing 10, which comprises an outer race 12, an inner race 14, a plurality of rolling elements 16 and a carbon-carbon composite retainer 18. The manufacture of such bearings, apart from retainer 18, is well known in the art and does not form a part of the present invention.

The carbon-carbon composite retainer 18 is fabricated by providing a woven tube, cutting the woven tube into suitably sized rings, piercing the rings for rolling bearing elements, and densifying the resulting retainer.

Referring now to FIG. 2, a woven tube is fabricated by first winding a carbon fabric 20 onto a cylindrical mandrel 22. Mandrel 22 has a length commensurate with the width of fabric 20. Mandrel 22 has at least one cavity 24 for later insertion of a heating element, not shown. Fabric 20 is wound onto mandrel 22 with a sufficient number of layers to provide a tube preform 26, as shown in FIG. 3. The number of layers is approximately equal to the desired thickness of the retainer 18 divided by the desired ply thickness of the fabric 20 at a predetermined fiber volume.

It is also within the scope of the present invention to weave carbon yarn or thread directly on mandrel 22 to provide a tube preform 26.

Fabric 20 is woven from carbon yarn. Such yarns are made by carbonizing pitch or any organic polymer yarn; however, commercially available carbon yarns are generally prepared from rayon, polyacrylonitrile (PAN) or pitch. An example of a suitable carbon yarn is HM 1000, available commercially from Hercules, Inc. Wilmington, Del., which is made from,) PAN precursor and has an end count of 1000 filaments per yarn bundle.

Fabric 20 may be any woven carbon fabric. The weave of the fabric can be plain, twill, satin or the like, with the plain weave being presently preferred. The carbon yarns used to weave fabrics generally have a thin coating of a polymer finish or sizing to protect the brittle fibers from self-abrasion during shipping and handling.

Fabric 20 may be a balanced fabric with equal numbers of warp and fill threads, e.g., 11.8×11.8 ends/cm. Alternatively, fabric 20 may have more fill threads than warp threads, e.g., 8.7×15.0 ends/cm. Winding of a fabric having an unequal end count provides a greater volume fraction of axial fibers.

It is within the scope of this invention to fabricate the tube preform 26 in homogeneous fashion using a single type of fabric, and in graded fashion. The graded construction employs a high axial end count fabric in the first portion, e.g., 8.7×15.0 ends/cm for the first ⅓ radius, a balanced fabric in the second portion, e.g., 11.8×11.8 ends/cm for the second ⅓ radius, and a high warp end count fabric for the outer portion, e.g., 15.0×8.7 ends/cm for the final ⅓ radius. In each case, the fill threads are parallel to the central core.

It is also within the scope of this invention to employ a bias-cut fabric to fabricate the tube preform 26. Bias-cut fabric has the warp and fill threads oriented at angles other than 0° and 90°, such as, for example ±45°. Bias-cut fabric is widely used in the tire and power transmission belt industries.

Fabric 20, or the yarns employed to weave the fabric, is coated or impregnated with a thermoplastic or, preferably, a thermosetting resin. Suitable thermosetting resins include phenolic, epoxy and furanic resins and the like. Suitable thermoplastic resins include coal tar pitch, petroleum pitch, polyvinyl acetate, polyvinyl alcohol, acrylic resin, and the like.

When a desired number of layers of fabric 20 have been wound onto mandrel 22, the mandrel with the fabric layers wound thereon, is inserted into a mold 28 having a cylindrical cavity 30 with a diameter equal to the desired outer diameter of retainer 18, as shown in FIG. 3. The mandrel 22 is then heated by any suitable means to expand the mandrel. Such heating may be accomplished by inserting at least one immersion or other suitable heater, not shown, into the cavity 24 in mandrel 22. The heated, expanding mandrel 22 compresses the fabric layers to conform to the limit of cavity 30. Heating of the mandrel 22 must be sufficient to melt or to cure the resin employed. Those skilled in the art will recognize that a mold release should be applied to the mandrel and to the surfaces of the cavity 30.

Figure 5:
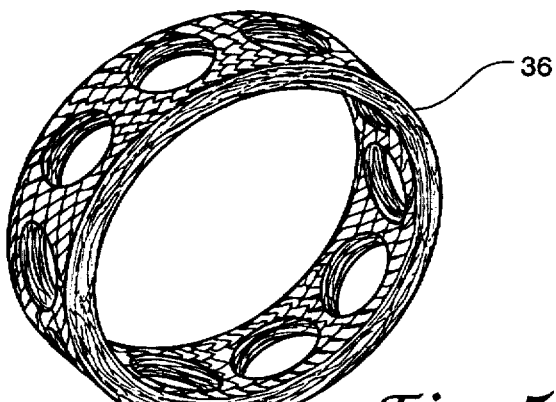
FIG. 5 illustrates a carbon-carbon composite retainer pierced for ball bearing elements.
Figure 6:
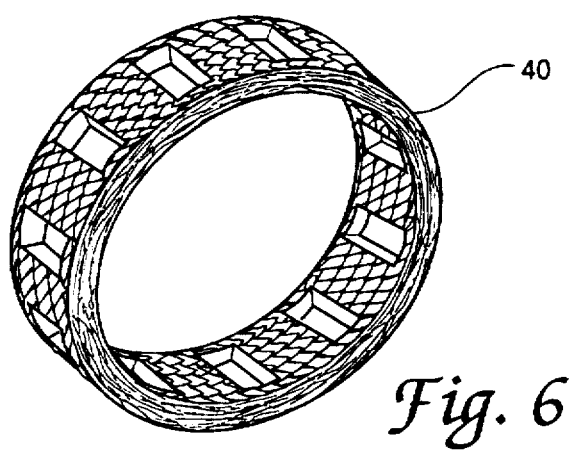
FIG. 6 illustrates a carbon-carbon composite retainer pierced for cylindrical bearing elements.

After cooling, the mandrel 22 and the resulting tube are removed from cavity 30. Tube 32 is shown in FIG. 4. Tube 32 is then cut into a plurality of retainer blanks 34, each having a suitable axial length. These blanks are then pierced, as shown in FIG. 5, to provide a retainer 36 for spherical rolling elements, i.e., balls; alternatively the blanks are pierced, as shown in FIG. 6, to provide a retainer 40 for cylindrical rolling elements, i.e., rollers.

The retainers 36 or 40 are then densified by the dry or liquid process, or by a combination of these processes. The dry process consists of providing deposition of pyrolytic carbon inside the structure of the reinforcement by decomposition of a hydrocarbon gas, such as methane. In the liquid process, the porous texture of the reinforcement is impregnated with a thermosetting resin or a thermoplastic carbon precursor, such as a phenolic resin, a furanyl resin, coal tar pitch, petroleum pitch, or the like, that is converted to carbon by heat treatment. The impregnation and carbonization cycle is repeated as often as necessary to densify the composite to a desired degree.

Alternatively, tube 32 can be densified, as described above, then cut into a plurality of retainer blanks 34 which are then pierced.

For use at operating temperatures below about 430° C., the retainer can be assembled into a rolling element bearing without further modification or treatment. For use at operating temperatures above about 430° C., means for preventing oxidation of the carbon-carbon composite must be provided, particularly at wear surfaces. Coatings based on organo-phosphorus and boron lubricant additives have been reported to inhibit the oxidation rate of carbon-carbon composites and are useful up to about 1000° C. Boron nitride, a high temperature solid lubricant, can be used to provide both lubricity and oxidation protection. Phosphorus additives are found in most synthetic liquid lubricants and are an essential ingredient in many vapor phase lubricants.

Thus, the combined use of the carbon-carbon composite retainer of the present invention with phosphorus-containing lubricants in liquid or vapor form offers one approach for achieving bearing operation from about 430° C. to about 650° C. Suitable phosphorous-containing compounds include t-butyl-phenolphosphate (TBPP), TBPP blended with tributyl-phosphate (TBP), TBPP blended with a polyalphaolefin, phosphazines, alkyl phosphate esters, and the like.

For use at operating temperatures above about 650° C., ceramic coatings, such as silicon carbide (SiC), silicon nitride ($Si_3N_4$) and boron nitride (BN) can be used to provide oxidation resistance for the carbon-carbon composite retainer at such elevated temperatures. It is known that certain solid lubricants, particularly cesium-based complex chalcogenides, react with silicon ceramics to form lubricious silicates. Thus, the use of these solid lubricants with silicon-ceramic coated carbon-carbon retainers is another approach for high temperature bearings.

The following example illustrates the invention:

EXAMPLE

Angular contact bearing retainers were fabricated from a carbon-carbon composite tube. The retainers were densified by chemical vapor infiltration (CVI), then inserted into hybrid (T15 tool steel races/silicon nitride balls) 206 size angular contact bearings for testing. The bearings were tested at temperatures of up to 520° C., speeds above 50,000 rpm (1.5 MDN), and thrust load of 445N using a blend of phosphate esters as vapor phase lubricant.

Conventional oil-lubricated angular contact bearings were fitted with a carbon-carbon retainer, as described above, and tested at low temperatures (25°–120° C.), speeds of up to 50,000 rpm (1.5 MDN) and a thrust load of 890N. Bearing frictional power loss at high speed (40,000–50,000 rpm) was about 20–30% less than that obtained with the same bearing fitted with a steel retainer.

An angular contact bearing retainer was fabricated from a carbon-carbon composite tube. The retainer was densified by CVI, then impregnated with a phosphate additive. The retainer was inserted into an all-ceramic silicon nitride 206 size angular contact bearing coated with cesium silicate solid lubricant. The bearing was tested for 4.8 hours at temperatures up to 700° C., speeds up to 40,000 rpm (1.2 MDN) and a thrust load of 445N, using an externally supplied cesium oxythiotungstate/tungsten disulfide powder lubricant mixture.

Various modifications may be made in the instant invention without departing from the spirit and scope of the appended claims.

We claim:

1. A rolling element bearing assembly comprising an inner race, an outer race, a plurality of rolling elements, and a carbon-carbon composite retainer wherein said composite retainer is coated with a ceramic coating.

2. The bearing assembly of claim 1 wherein said ceramic coating is silicon carbide.

3. The bearing assembly of claim 1 wherein said ceramic coating is silicon nitride.

4. The bearing assembly of claim 1 wherein said ceramic coating is boron nitride.

5. A rolling element bearing assembly comprising an inner race, an outer race, a plurality of rolling elements, and a carbon-carbon composite retainer wherein said retainer is coated with a phosphorous-containing compound.

* * * * *